United States Patent
Capoldi

(10) Patent No.: US 11,767,881 B2
(45) Date of Patent: Sep. 26, 2023

(54) ROLLING-ELEMENT BEARING, NOTABLY LARGE-DIAMETER ROLLING-ELEMENT BEARING

(71) Applicant: AKTIEBOLAGET SKF, Gothenburg (SE)

(72) Inventor: Bruno Capoldi, Charentenay (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/385,113

(22) Filed: Jul. 26, 2021

(65) Prior Publication Data

US 2022/0065291 A1 Mar. 3, 2022

(30) Foreign Application Priority Data

Sep. 2, 2020 (DE) .......................... 102020211033.6

(51) Int. Cl.
| F16C 19/38 | (2006.01) |
| F16C 33/60 | (2006.01) |
| F16C 33/51 | (2006.01) |
| F16C 19/36 | (2006.01) |

(52) U.S. Cl.
CPC .......... *F16C 19/381* (2013.01); *F16C 19/362* (2013.01); *F16C 33/513* (2013.01); *F16C 33/60* (2013.01); *F16C 2300/14* (2013.01)

(58) Field of Classification Search
CPC ...... F16C 19/362; F16C 19/381; F16C 33/51; F16C 33/513; F16C 33/516; F16C 33/60; F16C 2300/14; F16C 29/041; F16C 29/0628
See application file for complete search history.

(56) References Cited

U.S. PATENT DOCUMENTS

| 7,524,114 B2 | 4/2009 | Gresley |
| 8,905,646 B2 | 12/2014 | Omoto et al. |

(Continued)

FOREIGN PATENT DOCUMENTS

| DE | 859699 C | 12/1952 |
| DE | 6808805 U | 3/1969 |

(Continued)

OTHER PUBLICATIONS

Machine Translation of DE-102011085356-A1 (Year: 2011).*

(Continued)

*Primary Examiner* — Alan B Waits
(74) *Attorney, Agent, or Firm* — J-TEK LAW PLLC; Scott T. Wakeman; Mark A. Ussai

(57) ABSTRACT

A rolling-element bearing includes first and second rings having axial and radial raceways and a row of first radial rolling elements between the axial raceways. At least one row of axial rolling elements is located between a first radial raceway of the first ring and a first radial raceway of the second ring and radially located between an axial guiding face of the first ring and an axial guiding face of the second ring. The axial rolling elements are mounted in the pockets of a cage having a plurality of cage segments, and at least one second radial rolling element is circumferentially interposed between two adjacent cage segments of the plurality of cage segments and radially interposed between the axial guiding faces.

20 Claims, 4 Drawing Sheets

(56) References Cited

U.S. PATENT DOCUMENTS

2009/0257697 A1* 10/2009 Andersen ............... F03D 80/70
                                                       384/455
2013/0084034 A1   4/2013 Ince et al.
2017/0023064 A1*  1/2017 Capoldi ............... F16C 33/513
2018/0209477 A1*  7/2018 Sauter ................. F16C 33/60

FOREIGN PATENT DOCUMENTS

| DE | 2810116 A1       |   | 9/1979  |             |
|----|------------------|---|---------|-------------|
| DE | 102011085356 A1  | * | 5/2013  | F16C 33/4635|
| EP | 2092204 B1       |   | 8/2012  |             |
| EP | 2097651 B1       |   | 10/2012 |             |
| EP | 2307745 B1       |   | 5/2013  |             |
| JP | H0710554 U       | * | 2/1995  |             |
| JP | H0710554 U       |   | 2/1995  |             |
| WO | 2008058729 A1    |   | 5/2008  |             |
| WO | 2008064805 A1    |   | 6/2008  |             |
| WO | 2010009793 A1    |   | 1/2010  |             |

OTHER PUBLICATIONS

Office Action from the United States Patent Office dated Nov. 3, 2022 in related U.S. Appl. No. 17/385,189, including examined claims 1-14.

\* cited by examiner

ROLLING-ELEMENT BEARING, NOTABLY LARGE-DIAMETER ROLLING-ELEMENT BEARING

CROSS-REFERENCE

This application claims priority to German patent application no. 10 2020 211 033.6 filed on Sep. 2, 2020, the contents of which are fully incorporated herein by reference.

TECHNOLOGICAL FIELD

The present disclosure is directed to the field of large-diameter rolling-element bearings that can accommodate axial and radial loads and which have an inner ring and an outer ring arranged concentrically about an axis of rotation running in an axial direction and to bearing cage segments for such bearings.

BACKGROUND

Large-diameter rolling-element bearings may be used for example in a tunnel boring machine, in a mining extraction machine, in a big offshore crane or in a wind turbine.

A large-diameter rolling-element bearing comprises generally two concentric inner and outer rings, and a bearing assembly comprising two rows of axial rollers and one row of radial rollers. Such rolling-element bearings are generally loaded, both axially and radially, often with a relatively strong load.

Depending on the use of the roller bearing, considerable forces may arise, which may cause deformation of the bearing, notably of the rotating ring, leading in some cases, to local separation of the rings. As a matter of fact, a radial gap between the rotating ring and the fixed ring of the roller bearing can be created.

In order to overcome this drawback, the rolling-element bearing disclosed in patent EP-B1-2 092 204 comprises two opposite rows of radial cylindrical rollers and two opposite rows of axial cylindrical rollers disposed in such a way to surround a nose ring of the rotating ring.

However, the radial dimensions of such roller bearings require a considerable installation space. The mounting of the four rows of cylindrical rollers also requires a large number of assembly steps.

SUMMARY

One aim of the present disclosure is to overcome these drawbacks.

The disclosure relates to a rolling-element bearing comprising a first ring, a second ring, at least one row of radial rolling elements radially interposed between axial raceways of the rings, and at least one row of axial rolling elements axially interposed between radial raceways of the rings and radially located between axial guiding faces of the rings.

According to a first general feature, the rolling-element bearing also comprises at least one segmented cage for maintaining the row of axial rolling elements, the cage comprising a plurality of successive circumferential cage segments. Each of the cage segments is provided with at least two pockets each receiving at least one axial rolling element.

According to a second general feature, the rolling-element bearing further comprises at least one radial rolling element circumferentially interposed between two adjacent cage segments of the segmented cage, the radial rolling element being radially interposed between the axial guiding faces of the rings.

The terms "axial rolling elements" is understood to mean rolling elements adapted to accommodate only axial loads whereas the terms "radial rolling elements" is understood to mean rolling elements adapted to accommodate only radial loads.

With such an arrangement of the at least one radial rolling element, radial deformation of the rolling-element bearing and any gap opening between the inner ring and the outer ring in the radial direction are limited.

Two functions are achieved in the row having both the radial rolling element and axial rolling elements.

Here, with regard to a conventional rolling-element bearing comprising two rows of radial cylindrical rollers, the number of parts used to form the rings is reduced with the new design of the rolling-element bearing. The installation space required is therefore also reduced, and the design of the rolling-element bearing is compact. The number of assembly steps is also reduced.

Preferably, the rolling-element bearing comprises one radial rolling element circumferentially interposed between each end of each cage segment of the segmented cage and the facing end of the adjacent cage segment. Accordingly, the rolling-element bearing is able to bear high radial loads and high tilting moment.

Alternatively, the rolling-element bearing may comprise radial rolling elements circumferentially interposed between some adjacent cage segments of the segmented cage, the other cage segments of the cage abutting in the circumferential direction one relative to the other.

In one embodiment, each cage segment of the segmented cage comprises two abutting ends delimiting the cage segment in the circumferential direction and each comprising an outer abutting face, the radial rolling element abutting in the circumferential direction against the facing abutting faces of two adjacent cage segments.

The outer abutting faces of each cage segment of the segmented cage may each have a flat form. Alternatively, the outer abutting faces of each cage segment of the segmented cage each may have a concave or convex form.

The second ring may comprise a protruding nose engaged into an annular groove of the first ring and provided with an axial cylindrical surface onto which is formed the axial raceway of the second ring.

In one embodiment, the rolling-element bearing further comprises at least one additional row of axial rolling elements axially interposed between radial raceways of the first and second rings. The row of axial rolling elements and the additional row of axial rolling elements may be disposed axially on each side of the protruding nose of the second ring.

In one embodiment, the rolling-element bearing includes a first ring having a first axial raceway, a first radial raceway and a second radial raceway and having a second ring having a second axial raceway, a third radial raceway and a fourth radial raceway. A row of first radial rolling elements is located between the first and second axial raceways. A first row of axial rolling elements is located between the first radial raceway of the first ring and the third radial raceway of the second ring and radially located between a first axial guiding face of the first ring and a first axial guiding face of the second ring. The bearing also includes a cage for guiding the first row of axial rolling elements, and the cage comprises a plurality of successive circumferential cage segments, each of which includes at least two pockets containing at least one of the axial rolling elements and having two circumferentially spaced end walls having an outer surface. The bearing also includes a plurality of second radial rolling elements, one of the plurality of second radial rolling elements being located between the end walls of each adjacent pair of the cage segments in contact with the ends walls and radially interposed between the first axial guiding face of the first ring and the first axial guiding face of the second ring.

The row of axial rolling elements and the row of radial rolling elements may comprise cylindrical rollers.

BRIEF DESCRIPTION OF THE DRAWINGS

The present disclosure and its advantages will be better understood by studying the detailed description of specific embodiments given by way of non-limiting examples and illustrated by the appended drawings in which.

DETAILED DESCRIPTION

Figure 1:
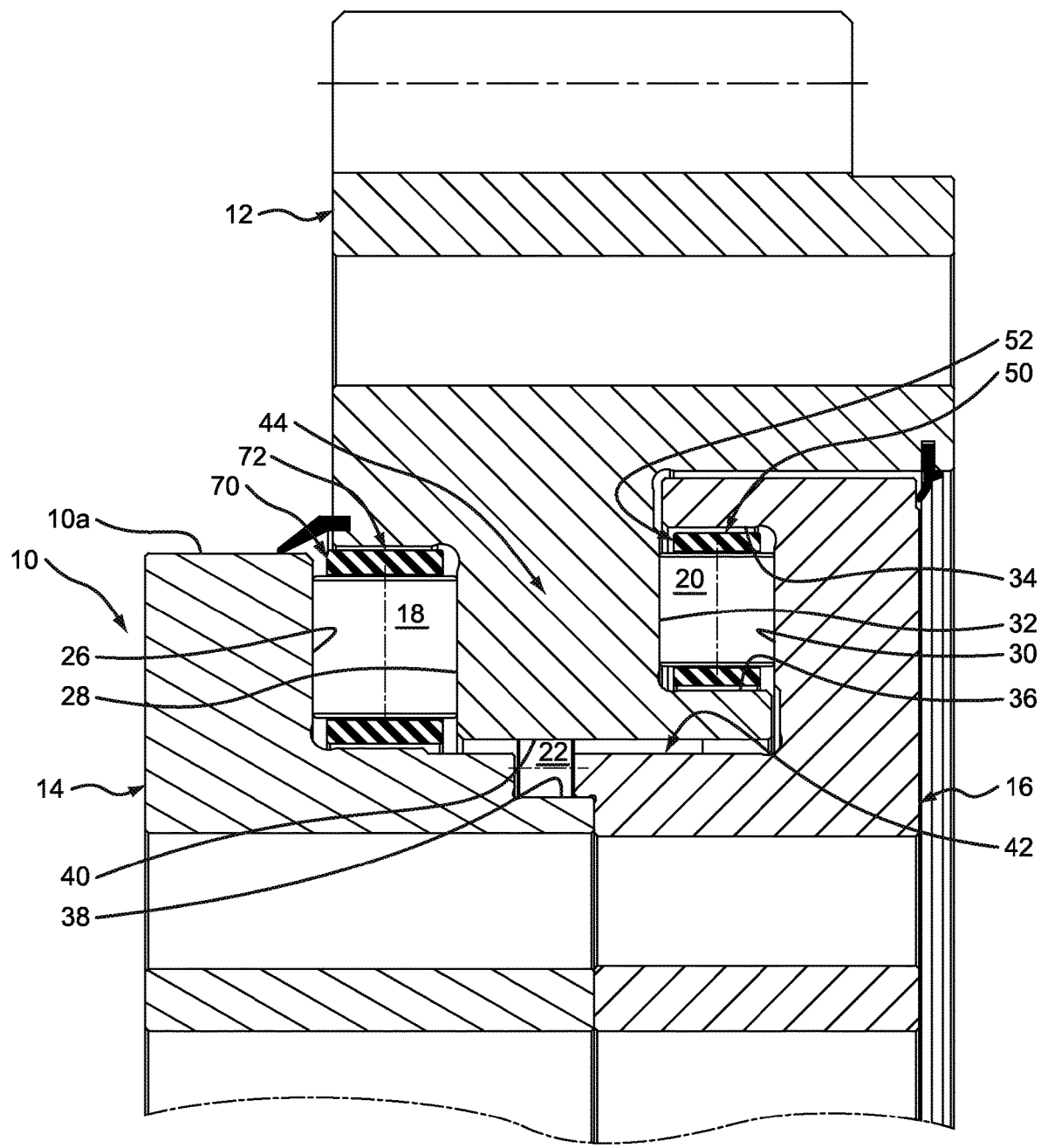
FIGS. 1 and 2 are partial cross-sections of a rolling-element bearing according to an embodiment of the invention.

The rolling-element bearing as illustrated on FIG. 1 is a large-diameter rolling-element bearing comprising a first ring 10 and a second ring 12. In the illustrated example, the first ring 10 is the inner ring whereas the second ring 12 is the outer ring. In this example, the outer ring 12 is a rotatable ring and the inner ring 10 is a non-rotatable ring. The rolling-element bearing may for example be used in a tunnel boring machine, a wind turbine, a big offshore crane or any other applications using a large diameter rolling-element bearing.

The inner and outer rings 10, 12 are concentric and extend axially along the bearing rotation axis (not shown) which runs in an axial direction. The rings 10, 12 are of the solid type.

The inner ring 10 is formed as a split ring and comprises a first ring 14 and a second ring 16 stacked one relative to the other in the axial direction. Each of the first and second rings 14, 16 of the inner ring is provided with a plurality of aligned through-holes (not shown) in order to be joined by fitting bolts.

In the illustrated example, the rolling-element bearing comprises two rows of axial rollers 18, 20 which are arranged between the inner and outer rings 10, 12 in order to form an axial thrust, and a row of radial rollers 22 arranged between the rings to form a radial thrust.

As will be described hereinafter, the rolling-element bearing also comprises radial rollers 24 (FIG. 2) circumferentially disposed between the axial rollers 20 of the row.

The rollers 18, 20, 22 of one row are identical to one another. Each roller 18, 20, 22 comprises a cylindrical outer rolling surface. Each roller 18, 20, 22 further comprises two opposite frontal end faces delimiting the outer rolling surface.

The axis of rotation of each roller 22 is parallel to the axis of the bearing and perpendicular to the axes of each or the rollers 18, 20. In the illustrated example, the axial length of the rollers 18 is larger than the length of the rollers 20. Alternatively, the axial length of the rollers 18 may be smaller than, or may be equal to, the length of the rollers 20.

The axial rollers 18 are interposed axially between annular radial raceways 26, 28 respectively formed on the inner and outer rings 10, 12. The raceways 26, 28 face each other in the axial direction.

The axial rollers 20 are interposed axially between annular radial raceways 30, 32 respectively formed on the inner and outer rings 10, 12. The raceways 30, 32 axially face each other. The rows of axial rollers 18, 20 are spaced apart from each other in the axial direction. The axial rollers 20 are located radially between annular axial guiding faces 34, 36 formed, respectively, on the inner and outer rings 10, 12. The guiding faces 34, 36 face each other in the radial direction. Each guiding face 30, 32 is straight and disposed perpendicular to the corresponding raceway 30, 32.

The raceway 30 and the guiding face 34 of the inner ring define together with the raceway 32 and the guiding face 36 of the outer ring an annular space inside which the axial rollers 20 are housed. The rolling surface of each axial roller 20 is in axial contact with the raceways 30, 32.

The radial rollers 22 are interposed radially between annular axial raceways 38, 40 respectively formed on the inner and outer rings 10, 12. The raceways 38, 40 face each other in the radial direction. The row of radial rollers 22 is radially offset inwards with respect to the rows of axial rollers 18, 20. The row of radial rollers 22 is axially located between the rows of axial rollers 18, 20.

The inner ring 10 comprises an annular groove 42 opening in a radial direction outwardly towards the outer ring 12. The inner ring 10 comprises an outer stepped cylindrical surface 10a from which the groove 42 is formed.

The outer ring 12 comprises an annular protruding nose 44 extending into the annular groove 42 of the inner ring. The nose 44 extends radially inwards. The protruding nose 44 protrudes radially from an inner cylindrical surface or bore of the outer ring.

The rows of axial rollers 18, 20 are arranged axially between the nose 44 of the outer ring and the groove 42 of the inner ring. The rows of axial rollers 18, 20 are disposed on each side of the nose 44. The radial raceways 28, 32 are located on the nose 44. The radial raceways 26, 30 are located on the groove 42 of the inner ring.

The row of radial rollers 22 is arranged radially between the nose 44 of the outer ring and the groove 42 of the inner ring. The axial raceways 38, 40 are located on the groove 42 and the nose 44, respectively. An inner cylindrical surface or bore of the nose 44 delimits the axial raceway 40. An axial bottom of the groove 42 delimits the axial raceway 38. The axial raceway 38 radially faces the inner cylindrical bore of the nose 44 onto which is formed the axial raceway 40.

The radial raceway 26 may be referred to as a "first" radial raceway; the radial raceway 30 may be referred to as a "second" radial raceway; the radial raceway 28 may be referred to as a "third" radial raceway; the radial raceway 32 may be referred to as a "fourth" radial raceway.

In the illustrated example, the outer ring 12 is made in one part. Alternatively, the outer ring 12 may be divided in the axial direction in at least two separate parts secured together. As previously mentioned, the inner ring 10 is divided in the axial direction in two separate parts, the first ring 14 and the second ring 16. The first and second rings 14, 16 delimit together the groove 42.

The rolling-element bearing further comprises a cage 50 for maintaining the axial rollers 20 spaced apart in the circumferential direction. The cage 50 maintains a regular circumferential spacing between the axial rollers 20. The cage 50 is housed inside the annular space defined by the raceway 30 and the guiding face 34 of the inner ring and the raceway 32 and the guiding face 36 of the outer ring. Each axial roller 20 is guided by the cage 50 which may bear against the guiding faces 34, 36, 32.

Figure 3:
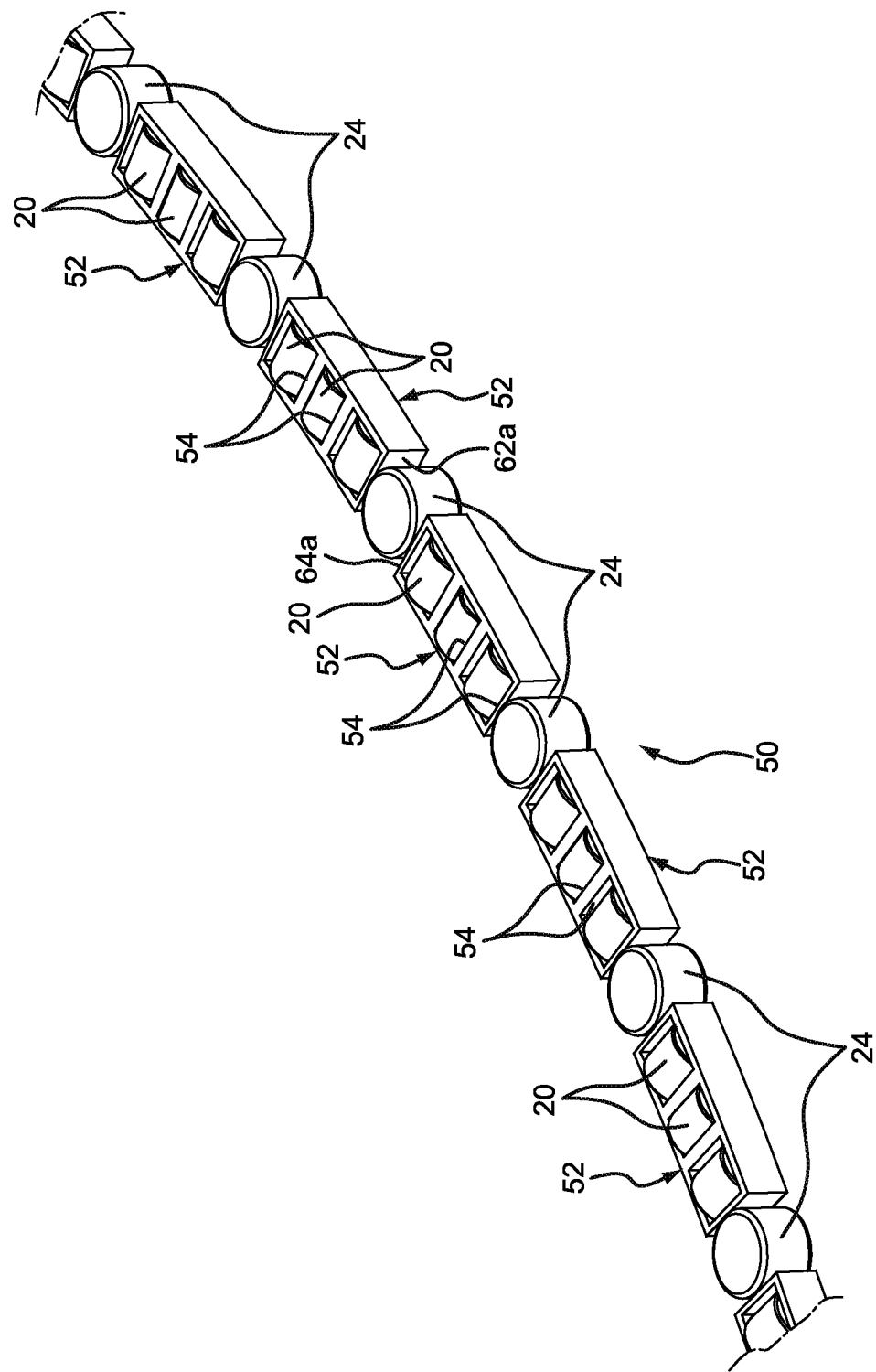
FIG. 3 is a partial perspective view of a segmented cage and rollers of the rolling-element bearing of FIGS. 1 and 2.

The cage 50 is segmented and is formed by a plurality of successive cage segments 52 as shown on FIG. 3. The cage 50 is formed as a split cage. A radial roller 24 is circumferentially interposed between each pair of two adjacent cage segments 52 of the segmented cage. Each radial roller 24 abuts against one of the cage segments 52 on one side and against the adjacent cage segment 52 on the other side.

Each cage segment 52 of the segmented cage delimits a plurality of pockets 54 each configured to receive one axial roller 20. Each cage segment 52 may advantageously be made in one part, for example from metal such as steel, brass or from plastic material. In the illustrated example, the cage segments 52 are identical one to another.

Figure 4:
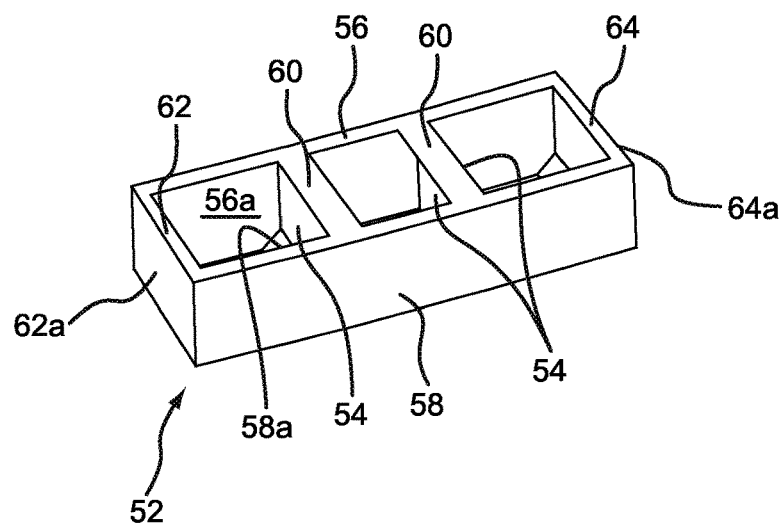
FIG. 4 is a perspective view of a cage segment of the segmented cage of FIG. 3.

As shown more clearly in FIG. 4, each cage segment 52 is provided with an inner cylindrical portion 56 and an opposite outer cylindrical portion 58 which extend in the circumferential direction. The inner and outer cylindrical portions 56, 58 delimit the cage segment in the radial direction.

The inner cylindrical portion 56 comprises an outer face (not referenced) oriented radially inward towards the guiding face 36 of the outer ring (FIG. 1). The outer cylindrical portion 58 comprises an opposite outer face (not referenced) oriented outward towards the guiding face 34 of the inner ring (FIG. 1). These outer faces delimit the cage segment 36 in the radial direction. In the mounted position in the rolling-element bearing, the outer face of the inner cylindrical portion 56 delimits partly the inner surface of the segmented cage, and the outer face of the outer cylindrical portion 58 delimits partly the outer surface of the cage.

The inner and outer cylindrical portions 56, 58 of each cage segment have inner contact surfaces 56a, 58a facing each other and forming bearing surfaces for the end faces of the associated roller 20 (FIG. 3) of each pocket. The spacing between the contact surfaces 56a, 58a is substantially equal to the length of the roller 20.

In order to delimit the successive pockets 54, each cage segment 52 comprises a plurality of bridges portions 60 extending radially between the inner and outer cylindrical portions 56, 58 and connected to the portions.

In the illustrated example, each cage segment 52 comprises three pockets 54. Alternatively, each cage segment 52 may comprise a different number of pockets. Preferably, each cage segment 52 is provided with at least two pockets 54.

Each cage segment 52 of the segmented cage also comprises two opposite end walls or abutting portions 62, 64 delimiting the cage segment in the circumferential direction and each comprising an outer abutting face 62a, 64a.

Referring once again to FIG. 3, each radial roller 24 is circumferentially interposed between the outer abutting face 62a of one cage segment 52 and the outer abutting face 64a of the adjacent cage segment 52. Each outer abutting face 62a, 64a of each cage segment 52 forms a local raceway for the associated radial roller 24. The abutting faces 62a, 64a of each cage segment are symmetric with respect to a radial plane passing through the center of the cage segment.

Figure 5:
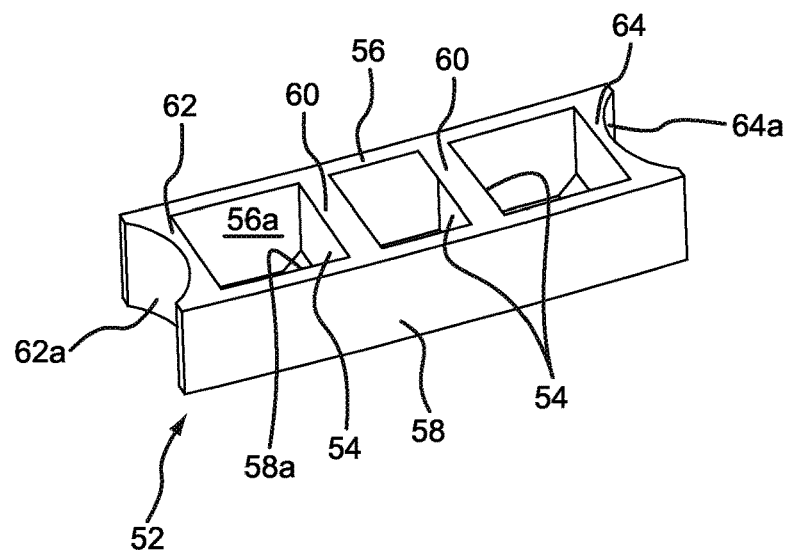
FIG. 5 is a perspective view of a cage segment of a segmented cage according to another embodiment of the invention.

In the illustrated example, each abutting face 62a, 64a has a flat form. Alternatively, each abutting face 62a, 64a may have a concave form having the shape of a cylinder segment as shown on FIG. 5. The radius of curvature of each abutting face 62a, 64a is slightly greater than the radius of the associated radial roller 24. The axis of the cylinder segment of each abutting face 62a, 64a of each cage segment extends perpendicular to the axis of the associated axial roller of each pocket 54 of the cage segment. The axis of the cylinder segment of each abutting face 62a, 64a is coaxial with the axis of the associated radial roller 24. The axis of the cylinder segment of the abutting face 62a of each cage segment and the axis of the cylinder segment of each abutting face 64a of the cage segment are parallel to each other. The axis of the cylinder segment of each abutting face 62a, 64a is offset outwards in the circumferential direction with regard to the abutting face.

The radial rollers 24 are identical to one another. Each radial roller 24 comprises a cylindrical outer rolling surface. The axis of rotation of each radial roller 24 is parallel to the axis of the bearing and perpendicular to the axes of each or the axial rollers 18, 20.

Figure 2:
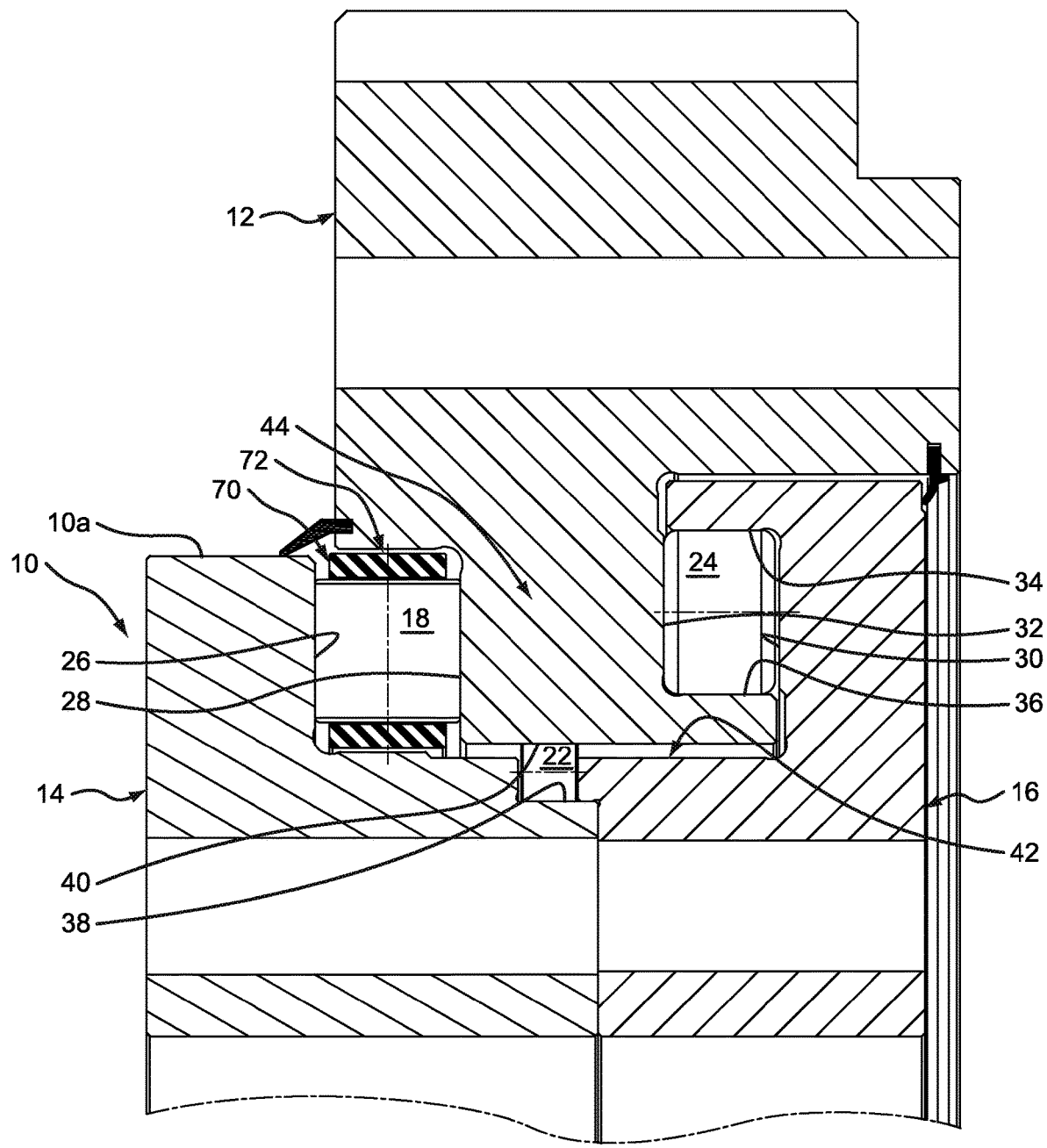

Referring to FIG. 2, the radial rollers 24 are interposed radially between the axial guiding faces 34, 36 of the inner and outer rings. The rolling surface of each radial roller 24 is in radial contact with the axial guiding faces 34, 36. The radial rollers 24 are located axially between the radial raceways 30, 32 of the inner and outer rings.

The rolling-element bearing also comprises a cage 70 for maintaining the axial rollers 18 spaced apart in the circumferential direction. The cage 70 is segmented and is formed by a plurality of successive cage segments 72 abutting in the circumferential direction one relative to the other. The cage 70 is formed as a split cage.

Otherwise, as previously mentioned, in this illustrated example, the first ring of the rolling-element bearing is the inner ring 10 whereas the second ring is the outer ring 12.

As an alternative, it could be possible to provide a reversed arrangement with the first ring forming the outer ring and the second ring forming the inner ring. In this case, the groove formed on the inner ring opens radially inwards and the nose of the outer ring extends radially outwards.

In the described examples, the rolling-element bearing is provided with a rolling-element bearing comprising three rows of rolling elements. Alternatively, the rolling-element bearing may comprise only two rows of rolling elements, or four or more rows of rolling elements. In the illustrated example, the rolling elements 18, 22 are rollers. The rolling-element bearing may comprise other types of rolling elements 18 and 22, for example balls.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved large-diameter rolling-element bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A rolling-element bearing comprising:
a first ring having a first axial raceway,
a second ring having a second axial raceway,
at least one row of first radial rolling elements radially interposed between the first and second axial raceways,
at least one row of axial rolling elements axially interposed between a radial raceway of the first ring and a radial raceway of the second ring and radially located between an axial guiding face of the first ring and an axial guiding face of the second ring, and
a cage for guiding said row of axial rolling elements, said cage comprising a plurality of successive circumferential cage segments, each of said cage segments including at least two pockets each containing at least one of the axial rolling elements, and
at least one second radial rolling element circumferentially interposed between two adjacent cage segments of the plurality of cage segments, said at least one second radial rolling element being radially interposed between the first and second axial guiding faces,
wherein each cage segment of the segmented cage comprises a first end and a second end circumferentially spaced from the first end,
wherein the first end defines a first abutment surface and the second end defines a second abutment surface,
wherein each of the at least one second radial rolling element abuts in the circumferential direction against the first abutment surface of a first one of the plurality of cage segments and the second abutment surface of an adjacent cage segment, and
wherein each of the at least one second radial rolling element comprises an axial end face and a side wall in contact with the axial guiding face of the first ring, and
wherein a diameter of each of the at least one second radial rolling element at the side wall is greater than a diameter of the axial end face.

2. The rolling-element bearing according to claim 1, wherein the at least one second radial rolling element comprises no more than one second radial rolling element between the two adjacent cage segments.

3. The rolling-element bearing according to claim 1, wherein first and second abutment surfaces are substantially planar.

4. The rolling-element bearing according to claim 1, wherein first and second abutment surfaces are concave.

5. The rolling-element bearing according to claim 1, wherein the second ring comprises a protruding nose projecting into an annular groove of the first ring and has an axial annular surface that forms the second axial raceway.

6. The rolling-element bearing according to claim 1, further comprising at least one additional row of axial rolling elements axially interposed between additional radial raceways of the first and second rings.

7. The rolling-element bearing according to claim 6, wherein said row of axial rolling elements and said additional row of axial rolling elements are disposed on axially opposite sides of the protruding nose of the second ring.

8. The rolling-element bearing according to claim 1, wherein said axial rolling elements and said second radial rolling elements are cylindrical rollers.

9. The rolling-element bearing according to claim 1, wherein the first ring is an inner ring and the second ring is an outer ring.

10. The rolling-element bearing according to claim 1, wherein an axis rotation of the rolling-element bearing is vertical.

11. The rolling-element bearing according to claim 1, wherein the side wall is cylindrical.

12. The rolling-element bearing according to claim 1, wherein an axial length of the axial guiding face of the first ring is greater than or equal to an axial length of the side wall of the at least one second radial rolling element.

13. A rolling-element bearing comprising:
a first ring having a first axial raceway, a first radial raceway and a second radial raceway,
a second ring having a second axial raceway, a third radial raceway and a fourth radial raceway,
a row of first radial rolling elements between the first and second axial raceways,
a first row of axial rolling elements located between the first radial raceway of the first ring and the third radial raceway of the second ring and radially located between a first axial guiding face of the first ring and a first axial guiding face of the second ring,
a cage for guiding the first row of axial rolling elements, said cage comprising a plurality of successive circumferential cage segments, each of said cage segments including at least two pockets each containing at least one of the axial rolling elements and having two circumferentially spaced end walls having an outer surface,
a plurality of second radial rolling elements, one of the plurality of second radial rolling elements being located between the end walls of each adjacent pair of the cage segments in contact with the ends walls and radially interposed between the first axial guiding face of the first ring and the first axial guiding face of the second ring, and
a second row of axial rolling elements located between the second radial raceway of the first ring and the fourth radial raceway of the second ring and radially located between a second axial guiding face of the first ring and a second axial guiding face of the second ring,
wherein each of the plurality of second radial rolling elements comprises an axial end face and a side wall in contact with the first axial guiding face of the first ring, and
wherein a diameter of each of the plurality of second radial rolling elements at the side wall is greater than a diameter of the axial end face.

14. The rolling-element bearing according to claim 13, wherein the end surfaces are planar.

15. The rolling-element bearing according to claim 13, wherein the end surfaces are concave.

16. The rolling-element bearing according to claim 13, wherein the second ring comprises a protruding nose projecting into an annular groove of the first ring, wherein the third radial raceway of the second ring is formed on a first surface of the nose and the fourth radial raceway of the second ring is formed on a second surface of the nose and the second axial raceway of the second ring is formed on a third surface of the nose.

17. The rolling-element bearing according to claim 16, wherein the first ring is a radially inner ring.

18. The rolling-element bearing according to claim 13, wherein an axis of rotation of the rolling-element bearing is vertical.

19. The rolling-element bearing according to claim 13, wherein the side wall is cylindrical.

20. The rolling-element bearing according to claim 13, wherein an axial length of the first axial guiding face of the first ring is greater than or equal to an axial length of the side walls of the second radial rolling elements.

* * * * *